Sept. 20, 1938. L. A. VON TILL 2,130,749
CAP AND PACKAGE
Filed Sept. 21, 1931
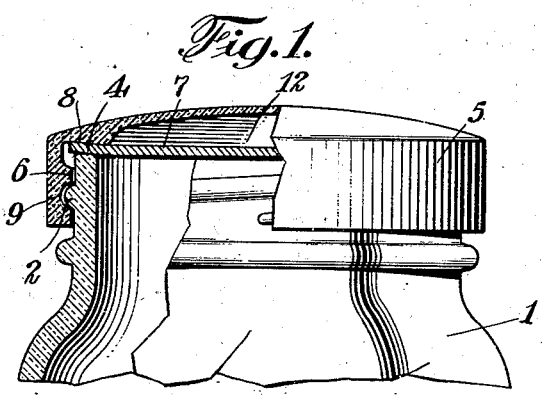
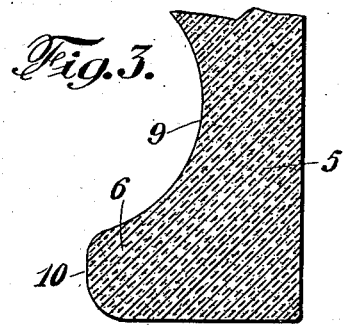
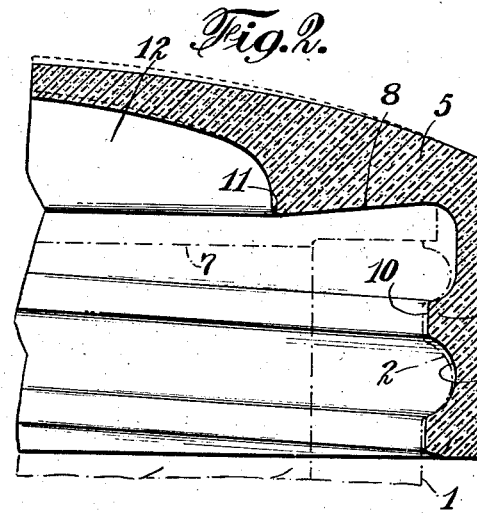
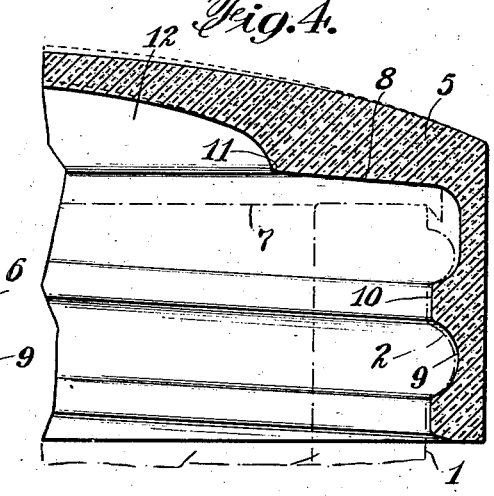
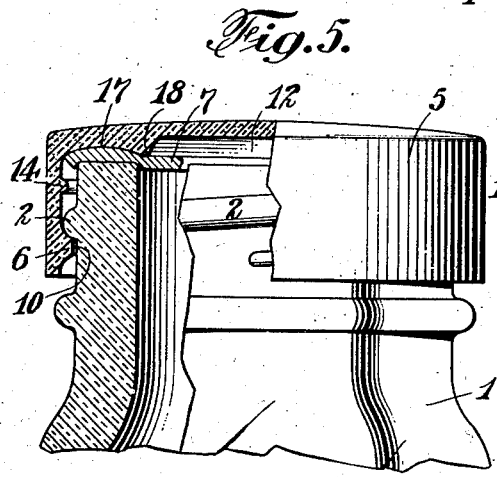
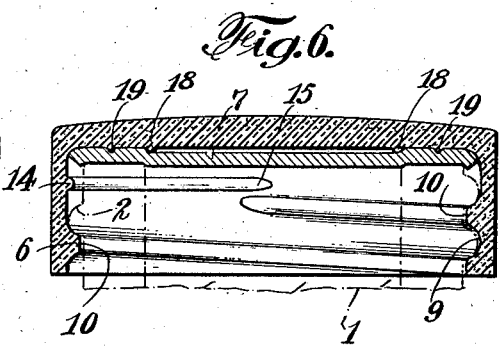
INVENTOR.
Louis A. Von Till
BY
his ATTORNEY Patented Sept. 20, 1938

2,130,749

UNITED STATES PATENT OFFICE 2,130,749

CAP AND PACKAGE

Louis A. Von Till, Brooklyn, N. Y., assignor to Anchor Cap & Closure Corporation, Long Island City, N. Y., a corporation of New York Application September 21, 1931, Serial No. 564,063

7 Claims. (Cl. 215—43)

The present invention relates to the sealing art, and more particularly to a cap made of moldable material and to a package formed thereby.

Molded closure caps made of phenol condensation products, cellulose acetate compounds and similar materials, have become popular due to their attractive appearance and to their resistive properties. Various products which are chemically active upon metal and which will corrode metals normally may be packed under molded caps without any chemical action whatever. In addition, the various colors and shapes which can be obtained merely by coloring material mixed with the molding materials and changes in the mold shape render the caps very beautiful and the packages very attractive.

One serious handicap in connection with molded caps, however, is the tendency for the caps to break when subjected to severe strains. The elasticity of the material is slight and, hence, any substantial tendency to stretch or bend the material occasions breakage. This situation is aggravated because the caps are used upon glass, which is even more rigid than the caps. Furthermore, under present manufacturing practices, glass varies a substantial amount, both in size and out-of-roundness. The position of the threads on the glass varies also. Glass factories are allowed certain tolerances which are prescribed in the trade, but the factories are not able, in all cases, to keep the glass within the tolerances allowed. As a result, the irregularities in the glass tend to break the molded caps or to impair the efficiency of the seal obtainable therewith. In addition, the wavy contour on the upper rim of the container, due to limitations in the manufacturing machinery, makes it difficult to provide a secure seal.

The present invention aims to overcome or minimize the above difficulties by providing a closure cap which is adapted to form a secure seal on glass containers varying a maximum amount in size and out-of-roundness. The present invention aims, in addition, to accomplish these results without increasing the cost of the cap or increasing the amount of material in the cap.

An object of the present invention is to minimize the breakage of molded caps in application to glass containers.

Another object of the invention is to improve the fit between the molded cap and container.

Another object of the invention is to increase the efficiency of the seal formed by molded caps.

Another object of the invention is to increase the flexibility of molded caps, thereby to improve the sealing qualities thereof.

A further object of the invention is to provide an inexpensive molded cap adapted to form an efficient and effective seal on glass containers.

A still further object of the invention is to reduce the cost of manufacture of molded caps.

Other and further objects of the invention will be obvious upon an understanding of the illustrated embodiment, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is a fragmentary side elevational view, partly in section, illustrating a preferred embodiment of the invention;

Fig. 2 is an enlarged fragmentary sectional view of the closure cap shown in Fig. 1, illustrating the shape of the threads and the flexure of the cover portion of the cap when applied to a container;

Fig. 3 is an enlarged fragmentary sectional view, illustrating the commencement of the thread at the bottom of the cap;

Fig. 4 is a fragmentary sectional view, illustrating the inclined sealing surface extending upwardly and inwardly;

Fig. 5 is a side elevational view, partly in section, illustrating a slightly different construction; and Fig. 6 is a sectional view of a cap applied to a container illustrating a modified form of the invention.

Referring again to the drawing, and more particularly to Figs. 1, 2 and 3, there is shown a container 1, preferably made of glass, having threads 2 thereon, and a sealing rim 4 at the mouth of the container. As indicated above, the size of the jar varies from a true standard and the position of the threads 2 may be higher or lower on one jar than on another. Likewise, the rim of the container 4 may be wavy, that is, it may have depressed parts which, though small, are nevertheless troublesome in making seals on the containers.

The closure cap 5 is applied to the jar 1 and has threads 6 engaging the threads 2 on the jar. A liner 7 is seated in the upper part of the cap and extends over the annular sealing zone 8 of the closure cap.

While the shape of the threads may be of any desired form, the preferred embodiment contemplates the construction thereof as shown in detail in Figs. 2 and 3. The thread 6 is formed in the wall of the cap by circumferentially extending grooves 9 intermediate the thread 6. In other words, the wall of the cap may be considered as a continuation of the flat inner surfaces 10 on the thread 6, the threads being formed by the grooves 9 above and below the thread 6. It will be noted that, by forming the thread in this manner, the flat surface 10 fits against the flat surface intermediate the threads or ribs 2 on the glass container, thereby causing a secure grip between the threads on the cap and threads on the container. The construction illustrated permits a maximum variation in the size of the container, without reaching a point where the threads on the cap will slip over the threads on the container. In addition, the accurate fit equalizes the pressure and spreads it over a substantial surface, thereby minimizing the tendency for the threads to shear.

The lower end of the thread 6, as shown more particularly in Fig. 3, decreases in width as the bottom of the skirt is approached, so that the thread will extend completely around the cap. The molding materials used in this type of cap are quite expensive and, both for appearance and to reduce the cost, the skirt of the cap is made as short as possible. The construction of the lower end of the thread, as illustrated in Fig. 3, enables the thread to extend further around the cap and to grip the container throughout its circumference, thereby eliminating any tendency for the cap to rise up at the point where the ends of the thread 6 meet. This uniform downward pull throughout the circumference of the cap and container eliminates any unbalanced stresses and minimizes breakage.

An important feature in the closure cap is the construction of the cover part thereof. The inclined sealing zone 8, shown in Figs. 1 to 3 as inclined outwardly and upwardly from the center of the cap to the skirt thereof, and inclined inwardly and upwardly in Fig. 4, has a very efficient action. It will be noted, in Fig. 2 particularly, that the outer periphery of the liner 7 is bent upwardly about the inner annular shoulder 11 of the inclined surface 8. The liner being made of cardboard, felt, or other suitable material, tends to retain its flat shape and increases materially the depressibility of the liner. By reason of the inclination, also, the sealing pressure is substantially greater at the inner side of the mouth of the container and adjacent the shoulder 11 of the cap than elsewhere. This increased pressure over a very small area improves the seal obtained. In applying a closure in accordance with the present invention to a container, the sealing action is noticeable from the time the rim of the container engages the liner in the cap. As the outer periphery of the liner is bent upwardly, the turning effort required increases until the cap is firmly sealed on the container. The inclined sealing zone 8 and the shoulder 11 increase the sealing period and minimize the chance of the cap becoming loose during shipping or other handling.

The central portion of the under side of the cover part of the cap is, preferably, though not necessarily, recessed, as shown at 12, giving a dome-like appearance to the inside of the cap. The purpose of this recess is to decrease the thickness of the cover part of the cap toward the center thereof. The greatest strains are naturally adjacent the rim of the container and these strains decrease as the center of the cap is approached. It is, therefore, unnecessary to have the same thickness of material in the center of the cap as at the periphery thereof. This recess not only decreases the amount of material required for the cap, but also increases the flexibility thereof. The thin central portion of the cap permits the cover part to flex upwardly within the limits of the material used, as illustrated more particularly in Fig. 2 of the drawings. The container is shown in dotted lines in Fig. 2, illustrating the pressure applied upwardly on the annular sealing zone 8, and the flexure of the cap after the sealing operation is illustrated in dotted lines. This, likewise, increases the amount of variation which the cap will take up without impairing the seal or breaking the closure.

A suitable liner ledge or rib 14 is provided for seating and holding the liner in place. This ledge may be of any desired form and, preferably, merges with the screw thread 6, at 15. The liner ledge 14 may be continuous or interrupted; preferably, it extends about three-quarters of the distance around the cap.

The construction in Fig. 4 differs from that shown in Figs. 1 and 3 in that the inclined sealing zone 16 applies the greatest pressure on the outer part of the rim of the container, instead of the inner part. Certain advantages may be obtained by this type of structure and it is here shown as an alternative form.

In Fig. 5, the inclined sealing zone 17 is shown substantially rounded and terminating in a crown or shoulder 18. The construction embodies the various advantages enumerated above and is also an alternate form of construction.

In Fig. 6, an annular rib 19 is shown formed on the surface of the sealing zone and adjacent an abrupt shoulder 18, such as that shown in Fig. 5. The rib 19 provides a very narrow sealing zone end, since the entire sealing pressure is applied substantially at this zone, a very high sealing pressure results. This provides an efficient seal and may be preferable to some of the other constructions, particularly in certain instances.

The present caps may be manufactured on existing equipment. With the liner ledge 14 omitted, the cap may be rotated off the molding pins. Preferably, the caps are stripped from the inner mold pins without rotation thereof. The threads provided herein are particularly applicable for this mode of manufacture.

When the caps are applied to containers, the thread 6, due to its shape, is adapted to take up maximum variations in the size of the container or the position of the thread. By reason of the construction of the lower end of the thread, a grip is obtained on the thread of the container throughout the circumference of the container, creating an even downward pull throughout the periphery of the cap and minimizing unbalanced strains. When the cap is screwed on, the rim of the container 4 engages the outer periphery of the liner 7 and forces it toward the inclined sealing zone 8 about the shoulder 11, giving a substantial distance for the cap to move from the commencement to the completion of the sealing operation. In addition, the recessed cover part of the cap is adapted to flex upwardly to increase the flexibility of the cap and the variations and inequalities which may be accommodated.

It will be seen that the present invention provides an improved thread adapted to co-operate with the threads on commercial jars to form an effective grip and seal. The inclined annular sealing zone and the dome-shaped cover portion of the cap increase the flexibility of the cap and the effectiveness of the seal, by giving a greater period between the commencement of the sealing action and the termination thereof. In other words, the amount the cap rotates from the commencement of the sealing operation to the completion thereof is substantially increased. The caps may be manufactured by existing machinery. The amount of material required is reduced to a minimum, thereby lowering the cost of manufacture thereof. The cap is rugged in construction and fully capable of withstanding the rough usage to which it may be subjected. It will be understood that the recess 12 may be omitted, if desired. The domed construction of the cover may be dispensed with, particularly in the smaller sizes, without sacrificing the other advantages attained by the invention.

By showing and describing several constructions embodying the invention, there is no intention of limiting the invention to these or other constructions, because various changes may be made in the form, construction and arrangement of parts without departing from the spirit and scope of the invention and without sacrificing its advantages.

Having thus described my invention, I claim:

1. A sealed package comprising a container having screw threads therein, a closure cap molded of a synthetic resin or the like having screw threads adapted to co-operate with the screw threads on the container, and a disc liner seated in said closure cap, an annular sealing zone in the cover portion of the cap adapted to press the liner against the rim of the container, said sealing zone inclining downwardly toward the center of the cap and upwardly toward the outer periphery, said cover portion being substantially thinner at the center thereof than at its periphery, to increase the flexibility thereof.

2. A closure cap made from a moldable material such as synthetic resins, having a cover portion and a depending skirt, screw threads in the skirt of the cap, said cap having a liner retaining ledge on the interior of the skirt adjacent the cover portion of the cap, the contour of said ledge being independent of the contour of the exterior of the cap, a disc liner seated on said ledge, an inclined annular sealing zone formed in the cover part of the cap adjacent the skirt thereof, the lower part of said zone being near the center of the cap and the higher part near the circumference thereof, and a dome-shaped recess formed in the central portion of said cover on the under side thereof to decrease the thickness of the cover part of the cap and to increase its flexibility, whereby the central part of the cover may flex upwardly to give a more resilient seal and to decrease the amount of the inclination of said inclined sealing zone.

3. A closure cap molded from synthetic resins or the like having a cover portion and a depending skirt, the inner and outer surfaces of said skirt being substantially cylindrical and parallel, screw threads formed in the skirt of said cap, said threads being of the same size and being formed by providing circular recesses intermediate adjacent threads on the inner cylindrical surface of the skirt of the cap whereby the inwardly extending portion of the thread is substantially flat on its inner edge and the portion of the thread intermediate the inwardly extending parts is substantially circular, a liner retaining ledge in the skirt of the cap, a disc liner of cardboard or similar material seated on said ledge adjacent the cover part of the cap, an inclined sealing zone formed in the cover portion of said cap adjacent the skirt thereof, said inclined zone extending downwardly further adjacent the center portion of the cap and upwardly further adjacent the periphery of the cap, the central portion of said cover part having a dome-shaped recess to increase the flexibility of the cap, said recess terminating at said inclined sealing zone whereby the outer periphery of the gasket is bent upwardly during the sealing operation and the central part of the cover portion is flexed upwardly whereby the bending of the liner out of its normal plane increases the resiliency of the seal and the flexing of the cover part of the cap further increases the resiliency of the seal.

4. A sealed package comprising the combination of a container having screw threads adjacent the mouth thereof, a closure cap molded from a synthetic resin or the like having a cover portion and a depending skirt, the inner and outer surfaces of said skirt being substantially cylindrical and parallel, screw threads formed in the skirt of said cap, said threads being of the same size and being formed by providing circular recesses intermediate adjacent threads on the inner cylindrical surface of the skirt of the cap, whereby the inwardly extending portion of the thread is substantially flat at its inner edge and the portion of the thread intermediate the inwardly extending parts is substantially circular, a liner retaining ledge in the skirt of the cap, a disc liner of cardboard or similar material seated on said ledge adjacent the cover part of the cap, an inclined sealing zone formed in the cover portion of the cap and independent of the contour of the exterior of the cover portion of the cap, said inclined zone extending downwardly further adjacent the center portion of the cap and upwardly further adjacent the periphery of the cap, the central portion of said cover part having a dome-shaped recess to increase the flexibility of the cap, said recess terminating at said inclined sealing zone whereby the outer periphery of the gasket is bent upwardly during the sealing operation and the central part of the cover portion is flexed upwardly whereby the bending of the liner out of its normal plane increases the resiliency of the seal and the flexing of the cover part of the cap further increases the resiliency of the seal.

5. A closure cap for a container molded from a synthetic resin or the like, comprising a cover portion and a depending skirt, said skirt having container engaging means therein, the under side of the cover portion having a sealing zone adapted to press a sealing member against the rim of the container, said cover portion being substantially concavo-convex and decreasing in thickness from the inner side of said sealing zone toward the center of the cover to increase materially the flexibility of the cover portion whereby said sealing zone is adapted to be held resiliently against the rim of the container and to decrease the amount of material required for the cap.

6. A closure cap for a glass container molded from a synthetic resin or the like which is frangible and comparatively rigid in its molded state, comprising a cover portion and a depending skirt, said skirt having container engaging means therein, the underside of the cover portion having a sealing zone inclined with respect to the rim of the container adapted to press a sealing member against the rim of the container, said cover portion having a cavity on the underside thereof which decreases the thickness of the cover portion from adjacent the inner side of the sealing zone toward the center of the cover to increase materially the flexibility of the cover portion, whereby said sealing zone is adapted to be held resiliently against the rim of the container and to decrease the amount of material required for the cap.

7. A closure cap for a glass container molded from a synthetic resin or the like, which is frangible and comparatively rigid in its molded state, comprising a cover portion and a depending skirt, said skirt having container engaging means therein, the underside of the cover portion having a sealing zone inclined with respect to the rim of the container adapted to press a sealing member against the rim of the container, said cover portion having a cavity on the underside thereof which materially decreases the thickness of the cover portion of the cap over a substantial area in the center of the cover portion to increase materially the flexibility of the cover portion and to decrease the amount of material required for the cap without impairing the strength of the cap.

LOUIS A. VON TILL.